June 30, 1936.  E. PRESSER  2,045,797
ILLUMINATION METER
Filed Dec. 26, 1933
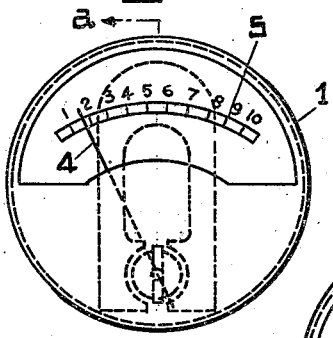
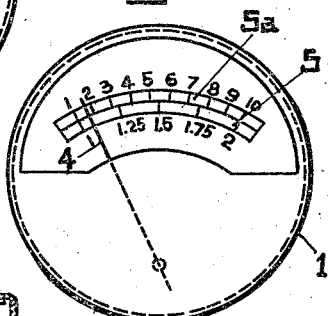
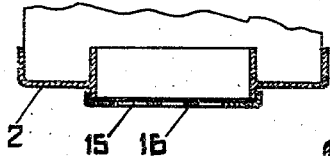
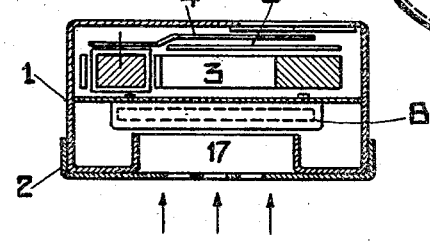
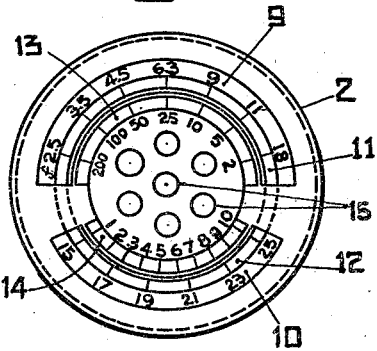
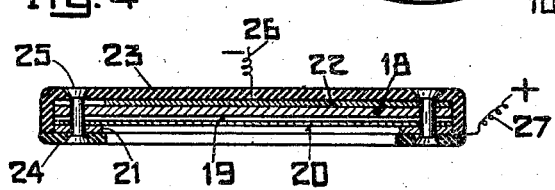
INVENTOR
ERNST PRESSER
BY
ATTORNEY Patented June 30, 1936

2,045,797

UNITED STATES PATENT OFFICE 2,045,797

ILLUMINATION METER

Ernst Presser, Berlin, Germany, assignor to Radio Patents Corporation, New York, N. Y., a corporation of New York Application December 26, 1933, Serial No. 704,060
In Germany November 22, 1932

9 Claims. (Cl. 88—23)

My invention relates to illumination meters and more particularly to an illumination meter for determining the correct time of exposure or shutter opening for photographic apparatus for which an application for patent has been filed in Germany dated Nov. 22, 1932. The meter, according to my invention, substantially consists of a light sensitive electric device illuminated by the object to be photographed and operating an electric indicating instrument. The reading of the instrument is a measure of the illumination of the photoelectric device and thus in turn indicates the degree of brightness of the object to be photographed. The reading of the instruments is then utilized numerically in order to determine the correct exposure time for any desired aperture or shutter opening of the lens of the photographic apparatus or vice versa, to determine the necessary aperture of the shutter for a predetermined exposure time and for a given degree of sensitivity or speed of the photoelectric plate or film used.

My invention is especially suited for use in connection with photo-voltaic cells, preferably of the barrier plane type as known in the art, which operate without the use of an additional source of current by directly converting the energy of the incident light radiation into an electrical current having an intensity approximately proportionate to the degree of illumination incident upon the cell. One kind of photoelectric cell of this type substantially consists of a metallic base having a thin layer of light sensitive material, such as selenium, applied thereon in a crystalline form. The selenium layer carries in turn a translucent metallic covering layer intimately united thereto and serving as a second terminal of the cell, the first terminal being formed by the metal base, as will be described in more detail hereinafter.

An object of my invention consists in providing a construction for an illumination meter of the type mentioned, which is simple and which may be easily operated by the user or photographer.

A more specific object of my invention is to provide means in connection with a photographic exposure meter whereby a minimum of size and bulk is obtained, making it possible to carry the meter without annoyance to the photographer.

According to one embodiment of my invention, to obtain the above purpose, I provide a circular, preferably a ring-shaped member carrying part of the conversion scales for determining the proper exposure time or shutter opening, respectively, corresponding to a given illumination indicated by the instrument. The ring-shaped member is fitted to the casing housing the electric indicating instrument and photoelectric cell. The casing furthermore carries the cooperating part of the converting scales for determining the proper time of exposure or lens opening, as desired. By merely displacing this ring member upon the casing, conversion of the instrument reading may be carried out in an easy manner into exposure times or shutter openings, respectively.

By the use of such member, preferably of ring-shape serving as a scale carrier and mounted upon the circumference of the instrument casing, the latter also being preferably of circular or cylinder shape, a minimum of weight and bulk of the device is insured, for besides the ring element snugly fitting to the surface, the casing requires no appreciable additional space and no further scale carrier is necessary as the cooperating scale is arranged upon the instrument casing itself. This advantage is of special importance for tourists and travellers where weight and bulk are to be eliminated to the farthest extent possible.

A further object of my invention is to provide simple and efficient means for securing different measuring ranges for an illumination or exposure meter, thus greatly extending its use and increasing its performance.

According to this further feature of my invention, the circular element or ring fitted to the casing of the instrument and carrying part of the conversion scales is designed to act as a shutter or screen placed in front of the photoelectric cell and purporting to afford different measuring ranges for the instrument. If the ring serving as a shutter is removed from the instrument, the photoelectric cell will receive full illumination and the measuring range of the device will extend from zero to a certain degree of illumination. If, on the other hand, the ring is placed on the device, it will screen part of the incident light rays, thus increasing the measuring range of the device to a multiple, for instance, to ten times the range when the screen or shutter is not applied. When using this latter range, comparatively high degrees of illumination may be measured, while when using the former range, the lower illumination values may be ascertained with greater accuracy.

It has already become known to insert an electric resistance in the cell circuit for securing several measuring ranges of the device. Such a solution, however, greatly complicates the manufacture and operation of such devices. The difficulties in this case are much higher than, for instance, in the provision of several measuring ranges in an ordinary ampere meter or volt meter by means of series resistances since the change of the electric resistance of the circuit will result in a change of the relationship between a pointer reading of the indicating instrument and the degree of illumination, thus making it impossible to use the same scale for indicating different measuring ranges. This drawback may not be obviated completely by maintaining the resistance of the circuit constant for several measuring ranges, as the inner resistance of the photoelectric cell varies strongly with the degree of illumination, especially in the case of cells of the type as referred to above.

In an arrangement according to the invention, when passing from one measuring range to another, not only the load circuit of the photoelectric cell remains unchanged, but also the photoelectric cell receives no higher illumination when using the second or third measuring range. According to a further advantage of the invention, switching arrangements and resistances are dispensed with and the same scale may serve for indicating different measuring ranges. Besides, the photoelectric cell even with great light intensities to be measured is always subjected to comparatively small light intensities or degrees of illumination, thus being protected from damage by excessive light. In this manner, the operating characteristics is preserved and the life of the cell increased to a substantial extent.

When using the circular or ring-shaped element serving as a scale carrier to act also as a screen, the screening may be accomplished in different manners. Thus, for instance, the opening through which the light rays pass on to the photoelectric cell may be varied such as by using different rings having different openings or by providing a number of exchangeable cover members fitted on to the circular ring, each having a different opening; or furthermore, by providing exchangeable cover elements of different degrees of transparency to the incident light rays.

If the screening is accomplished by changing the aperture of the shutter through which the light passes to the cell, such as for instance, by an arrangement similar to the well known adjustable iris diaphragm known for adjusting the aperture of a photographic lens in photographic apparatus, it may occur when using an arrangement according to the invention that the illumination of the cell is no longer evenly distributed over the entire surface thereof, resulting in a change of the operating characteristic of the cell.

Accordingly, it is a further object of my invention to provide a shutter device to be placed in front of the photoelectric cell for securing a different measuring range of the indicating instrument in such a manner that a substantially even distribution of the light over the entire surface of the cell is insured.

This latter object is accomplished according to one embodiment of my invention by providing a plurality of openings for the shutter in front of the cell instead of a single opening as mentioned hereinbefore. In this manner an even distribution of the incident light is obtained over the entire surface of the photoelectric cell, thus insuring constant characteristic of the cell and equal relationship between the photoelectric current and the amount of illumination or degree of brightness of the object to be photographed. The small openings of the shutter may be connected with each other or may be separate from each other, it being essential that light rays are not passed to the photoelectric cell in a single or concentrated beam at a single place through the shutter or screen.

When using a shutter in front of the cell for passing the incident light for obtaining a different measuring range, the further difficulty is experienced that in the case of a very small shutter opening, light acts on the cell surface coming from a part only of the object to be photographed, thus resulting in a faulty measurement and in turn in a wrong time of exposure or shutter aperture, respectively. As is well understood, when measuring the degree of brightness of an object to be photographed, the light from all parts of the object should be used to act on the photoelectric cell to obtain a reading of the instrument giving the average or integrated value of the brightnesses taken over all the parts of the object to be photographed. This as is understood would not be the case under certain conditions when using a very small shutter opening.

Accordingly it is a further object of my invention to provide a shutter in front of the photoelectric cell for securing a different measuring range affording light coming from all portions of the object to be measured to evenly effect the photoelectric cell.

This latter object is also accomplished by properly arranging a plurality of holes or openings in the shutter suitably distributed over the shutter surface to secure a simultaneous effect on the photoelectric cell from substantially all parts of the object to be photographed.

The conversion scales carried by the measuring arrangement usually comprise four quantities: First, the pointer reading on the electric instrument being a measure of the degree of illumination or brightness of the object to be photographed; Second, the aperture or opening of the camera shutter; Third, the exposure time necessary for taking the picture; and Fourth, the sensitivity or speed of the photographic emulsion of the film or plate used. If, for instance, a special film or plate of known make having a definite sensitivity or speed is used, there corresponds to each position of the pointer or brightness of the objects, a set of corresponding exposure times and shutter openings, the latter being inversely related to each other, as is well known.

According to a further embodiment of my invention, these four quantities are arranged on only two displaceable circular scales in such a manner that each two are arranged on the circumference of one circle. This arrangement presents the advantage that the numerical conversion of the pointer reading as mentioned hereinbefore may be effected by means of a single operation or setting of the converting arrangement for any desired sensitivity of the plate or film used.

Further objects and features of my invention will be more fully known as the following description proceeds, taken with reference to the accompanying drawing in which I have illustrated by way of example one form of embodiment of the invention. As is understood, the underlying principle of the invention is subject to many variations and modifications coming within its broader scope, as set forth in the appended claims.

Figure 1 shows a front view of an illumination or exposure meter according to the invention.

Figure 2 is a cross section taken on line a—a according to Figure 1.

Figure 3 represents a rear view of an instrument according to Figures 1 and 2 showing the arrangement of the conversion scales and the shutter device for securing different measuring range.

Figure 4 illustrates on an enlarged scale the construction of a preferred type of photoelectric cell used in the device according to the invention.

Figure 5 is a partial view similar to Figure 2 illustrating a removable cover or shutter member for obtaining different measuring ranges;

And Figure 6 shows another front view with two measuring scales for separate measuring ranges.

Similar reference numerals identify similar parts throughout different views of the drawing.

Referring now particularly to Figures 1, 2, and 3 of the drawing, I have shown at 1 a casing, preferably of light metal for housing both the electric instrument and the photoelectric cell and provided with a ring shaped cover member 2 snugly fitted to the casing and adapted to be rotated relative thereto. The indicating instrument is arranged at one side of the casing and a photoelectric cell and the cover 2 at the other side of the casing, as shown. The indicating instrument may be of any well known type and has merely been indicated schematically, being provided with an indicating pointer 4 moving over a dial carrying an indicating scale 5. The photoelectric cell, as shown at 8, is preferably of the type known as barrier plane voltaic cell shown in more detail and on an enlarged scale by Figure 4. The cell comprises a base plate 18 such as an iron disc upon which is applied a thin layer 19 of photoelectric material preferably selenium or the like in its crystalline form. The light sensitive layer 19 in turn is covered with a closely and intimately adhering transparent covering layer 20 of conducting material applied by a sputtering method or the like. The thus obtained photoelectric element is then mounted and provided with terminal wires for connection in an electric circuit such as by means of a casing 23 of insulating material upon which there is screwed on a cover 24 by means of countersunk screws 25. For securing good electrical connections, a spring member 22 is placed between the bottom of the casing and the base plate 18 and a ring-shaped electrode 21 placed on top of the covering layer. The ring electrode 21 is connected to the positive terminal as indicated at 27, the base plate 18 forming the negative terminal and being connected to the negative electrode of the cell as indicated at 26. Terminals 26 to 27 are connected with the indicating instrument, as is well understood.

When light is impinged on the sensitive surface of the cell as shown by the arrow in Figure 2 passing through the translucent covering layer and effecting the photoelectric substance, an electro-motive force is generated at the terminals of the cell and a current established in the connected circuit of the indicating meter. As is known, the intensity of the current is approximately proportional to the amount of incident illumination affecting the cell.

Returning to Figures 1 to 3, I have shown the displaceable member or ring 2 being provided with a pair of arc-shaped slots 9 and 10 adjacent to circular scales 13 and 14, respectively. Furthermore, the surface of the casing 1 visible through the slots 9 and 10 of the cover ring 2 carries the cooperating circular or arc-shaped scales 11 and 12, respectively, as shown. Scales 13 and 14 may be displaced by turning the ring 2 relative to scales 11 and 12, respectively, in such a manner that only a single adjustment is necessary to set the measuring arrangement. In the example shown, the scale 12 may indicate the speed or sensitivity of the photographic film or plate used, scale 14 may be calibrated according to indications of the electric instrument, scale 13 may represent the exposure time in seconds, and scale 11 the shutter opening of the photographic objective. The sensitivity of the plate or film may be given in a desired system of measurement known such as in degrees of Scheiner, ranging from about 17° to 27° according to the usual values of photographic emulsions as used today, and the aperture values may be the usual relative values known and ranging from about f2 to f18 as is customary with photographic objectives known in the art, the exposure time being in fractions of a second as indicated, whole numbers (for example 25) meaning the reciprocal values (1/25) as is customary in photographic camera work.

Thus, by holding the instrument towards the object to be photographed with the side carrying the cover 2 being directed against the object and the indicating instrument directed against the observer and ascertaining the reading of the pointer 4, the corresponding exposure times and shutter openings may be found on the opposite scales 11 and 13 by a single setting of the ring member 2 by placing the number corresponding to the pointer reading on scale 14 opposite the number representing the value of the speed of the film or plate used represented on the opposing scale 12.

It is immaterial for the invention, as is well understood, whether the scales are arranged on the front side of the device as illustrated or on its cylindrical surface. It is further immaterial whether the ring member 2 serving as a scale carrier is arranged at the side of the meter carrying the indicating instrument or whether it is arranged at the opposing side housing the photoelectric cell or alternatively upon a projection of the casing.

If it is desired to use the device to measure small brightnesses the ring member 2 serving as a cover for the casing is removed and the opening 17 or surface of the light sensitive cell 8 of the device directed against the object it is desired to photograph. If, on the other hand, the device is to be used under very bright illumination, the second measuring range should be used by placing the ring or cover member 2 on the casing and holding the instrument with the openings 15 on the cover 2 directed towards the object to be photographed. In this case, the photographic cell receives only so much light as passes through the apertures 15. The apertures 15, as pointed out hereinbefore, are distributed over the surface of the cover 2 substantially evenly, as shown, to insure uniform illumination and even effect and operating characteristics of the illuminating device as well as to insure that light emanating from substantially all portions of the object to be photographed equally affects the light sensitive surface of the cell 8. In this manner the pointer 4 may indicate for instance ten times the amount of its deviation if no cover or shutter 2 were used whereby it is possible to measure ten times the amount of brightness as in the case when no cover or shutter is applied. As is seen, by using the cover 2 both as a shutter or screen and as a scale carrier, a minimum in bulk and size of the device is obtained.

When only two measuring ranges are desired, the cover 2 may serve at the same time as a shutter, as described, or alternatively and especially when more than two measuring ranges are desired, an additional exchangeable cap or shutter member 16 may be provided covering the central opening of the ring member 2, as shown in Figure 5. For this purpose, it is only necessary to vary the size and distribution of the apertures 15 in the cover and shutter members 16. To further facilitate the use of the instrument, different scales corresponding to the different measuring ranges may be provided, clearly characterized such as by different colors, etc., as shown in Figure 6 illustrating two scales 5 and 5a, one corresponding to one measuring range and the other corresponding to five times the measuring range. Both scales may be characterized by different colors corresponding to the color or other differentiation of the cover members 16 for the respective measuring ranges.

The arrangement according to the invention as shown in which the photoelectric cell and the measuring instrument are mounted one next to the other whereby the indicating dial of the instrument and the photoelectric cells are at opposite sides of the device has the advantage that when the device is directed against the object to be measured the readings of the instrument on the other side may be easily ascertained and at the same time the great advantage of a minimum of size and bulk is insured by such construction. The casing of the device may consist of a single or of several parts as is understood, and it necessarily need not be of circular shape as shown. Thus, for instance, for reasons of aesthetic design and appearance it may partially have the shape of a regular polygon which gradually assumes the circular shape where the ring 2 is to be mounted.

I claim:

1. A photographic exposure meter comprising a casing, a photoelectric element mounted therein, said photoelectric element having a flat light sensitive surface and being capable of generating an electric current when struck by light, an electric measuring instrument having an indicating scale also mounted in said casing and being electrically connected to said photoelectric element, a removable cover for said casing disposed opposite said light sensitive surface, means whereby said cover member acts as a screen for shutting off a predetermined fraction of the amount of light incident upon said light sensitive surface for securing two different measuring scale ranges of said instrument when said cover is applied and removed, respectively, said cover being furthermore arranged in sliding engagement with said case, and a plurality of adjacent cooperating scales on said cover and said casing for evaluating the readings of said instrument in terms of exposure control values for a photographic camera.

2. A photographic exposure meter comprising a casing, a photoelectric element mounted therein, said photoelectric element having a flat light sensitive surface and being capable of generating an electric current when struck by light, an electric measuring instrument also mounted in said casing and electrically connected to said photoelectric element, a removable cover disposed opposite said light sensitive surface and fitted in sliding engagement to said casing, said cover having a plurality of apertures to distribute evenly incident light rays over the sensitive surface of said photoelectric element, and to act as a screen for shutting off a predetermined fraction of the amount of light impinged upon said light sensitive surface for securing separate measuring scale ranges of said instrument when the cover is applied or removed from said casing, respectively, said cover and said casing carrying a plurality of adjacent cooperating scales for converting the readings for said instrument into exposure control values for a photographic camera.

3. A photographic exposure meter comprising a casing, a photoelectric element mounted therein, said photoelectric element having a flat light sensitive surface and being capable of generating an electric current when struck by light, an electric measuring instrument also mounted in said casing electrically connected to said instrument, a removable cover disposed opposite said light sensitive surface and fitted in sliding engagement to said casing, said cover being provided with a plurality of apertures evenly distributed over its surface to pass a light issuing from substantially all parts of an object being tested and to evenly distribute it over said sensitive surface of said photoelectric element, said cover furthermore acting as a screen for shutting off a predetermined fraction of the amount of light striking said light sensitive surface of said photoelectric element for securing different measuring scale ranges of said instrument when said cover is applied to and removed from said casing, respectively, and a plurality of cooperative adjacent scales carried by said casing and said cover and calibrated in readings of said instrument, sensitivity of the photographic negative materials on the one hand and correlated shutter speed and diaphragm opening values for photographic cameras on the other hand.

4. A photographic exposure meter comprising a casing, a photoelectric element mounted therein, said photoelectric element having a flat light sensitive surface and being capable of generating an electric current when struck by light rays, an electric measuring instrument also mounted in said casing electrically connected to said photoelectric element, a cover for said casing disposed opposite said light sensitive surface and fitted in sliding engagement to said casing, said cover having an opening and a removable lid covering said opening and adapted to act as a screen for shutting off a predetermined fraction of the amount of incident light striking the sensitive surface of said photoelectric device for securing different measuring scale ranges of said instrument when said lid is applied to or removed from said cover, respectively, and a plurality of adjacent cooperating scales carried by said casing and said cover for evaluating the readings of said instrument in terms of exposure control values for a photographic camera.

5. A photographic exposure meter comprising a casing, a photoelectric element mounted therein, said photoelectric element having a flat light sensitive surface and being capable of generating an electric current when struck by light rays, an electric measuring instrument also mounted within said casing electrically connected to said instrument, a cover disposed opposite said light sensitive surface and fitted in sliding engagement to said casing, said cover having an opening, a removable lid member covering said opening having a plurality of apertures of predetermined diameter evenly distributed over the light sensitive surface of said photoelectric device to act as a screen shutting off a predetermined fraction of the amount of light impinged upon said light sensitive surface and serving to secure different measuring ranges in said instrument when said lid is applied to and removed from said cover, and a plurality of cooperating adjacent scales on said casing and said cover for evaluating the readings of said instrument in terms of exposure control values for a photographic camera.

6. A photographic exposure meter comprising a cylindrical casing, a photoelectric element mounted therein, said photoelectric element having a flat disc shaped surface and being capable of generating an electric current when struck by light rays, an electric measuring instrument also mounted within said casing electrically connected to the photoelectric element, a cover disposed opposite said light sensitive surface and having a cylindrical extension fitted to and being in sliding engagement with said casing, said cover having an opening, a removable lid covering said opening and provided with a plurality of apertures arranged to evenly distribute incident light over said light sensitive surface and adapted to shut off a predetermined fraction of the amount of incident light impinged upon said light sensitive surface of said photoelectric element, and sets of adjacent graduations on said casing and on said cover calibrated in readings of said instrument and photographic emulsion speed on the one hand and shutter speed and diaphragm opening values on the other hand for evaluating the readings of said instrument in terms of exposure control values for a photographic camera.

7. A photographic exposure meter comprising a casing, a photoelectric element mounted therein, said photoelectric element having a flat light sensitive surface and being capable of generating an electric current when struck by light, an electric measuring instrument also mounted within said casing and electrically connected to said photoelectric element, said instrument having a plurality of scales covering separate measuring ranges, a cover member opposite said light sensitive surface fitted in sliding engagement to said casing, said cover member having an opening, a removable lid covering said opening provided with a plurality of apertures evenly distributed over said light sensitive surface and adapted for shutting off a predetermined fraction of the amount of light impinged upon said light sensitive surface, correlated with said indicating scales for securing separate measuring ranges of said instrument when said lid is applied to and removed from said cover, respectively, and a plurality of adjacent graduations on said casing and said cover, respectively, for evaluating the readings for said instrument in terms of exposure control values for a photographic camera.

8. A photographic exposure meter comprising a casing, a photoelectric element mounted therein, said photoelectric element having a flat light sensitive surface and being capable of generating an electric current when struck by light, an electric measuring instrument also mounted within said casing electrically connected to said element, and a removable cover for said casing disposed opposite said light sensitive surface and having a part adapted to pass a predetermined fraction of light incident to said photoelectric element, said cover being fitted in sliding engagement to said casing, a first set of adjacent cooperating scales on said casing and said cover calibrated in readings of said instrument and emulsion speeds, and a second set of cooperating adjacent scales on said casing and said cover member calibrated in shutter speed and diaphragm apertures for converting the readings of said instrument into exposure control values for a photoelectric camera.

9. A photographic exposure meter comprising a casing, a photoelectric element mounted therein, capable of generating an electric current when struck by light, an electric measuring instrument also mounted within said casing electrically connected to said element, and a removable cover for said casing being in sliding engagement therewith, said cover having a part located in front of said photoelectric element and adapted to pass a predetermined fraction of light incident to said photoelectric element, a first set of adjacent cooperating scales on said casing and said cover calibrated in readings of said instrument and emulsion speeds, respectively, and a second set of cooperating adjacent scales on said casing and said cover member calibrated in shutter speeds and diaphragm apertures for converting the readings of said instrument into exposure control values for a photoelectric camera.

ERNST PRESSER.